United States Patent
Watson et al.

(10) Patent No.: US 11,922,738 B2
(45) Date of Patent: Mar. 5, 2024

(54) FUSION OF AVIATION-RELATED DATA FOR COMPREHENSIVE AIRCRAFT SYSTEM HEALTH MONITORING

(71) Applicant: GE Aviation Systems Limited, Cheltenham (GB)

(72) Inventors: Maria Louise Watson, Eastleigh (GB); Robert William Horabin, Eastleigh (GB); Christopher Catt, Eastleigh (GB); Frank Beaven, Eastleigh (GB); Olivier Paul Jacques Thuong, Eastleigh (GB); Thomas Antoine Raymond Bermudez, Eastleigh (GB); Aishwarya Coffey, Eastleigh (GB)

(73) Assignee: GE Aviation Systems Taleris Limited, Cheltenham (GB)

( * ) Notice: Subject to any disclaimer, the term of this patent is extended or adjusted under 35 U.S.C. 154(b) by 72 days.

(21) Appl. No.: 16/068,440

(22) PCT Filed: Jan. 4, 2017

(86) PCT No.: PCT/EP2017/050162
§ 371 (c)(1),
(2) Date: Jul. 6, 2018

(87) PCT Pub. No.: WO2017/118670
PCT Pub. Date: Jul. 13, 2017

(65) Prior Publication Data
US 2019/0026963 A1 Jan. 24, 2019

(30) Foreign Application Priority Data
Jan. 6, 2016 (GB) ...................... 1600237

(51) Int. Cl.
*G07C 5/08* (2006.01)
*B64D 45/00* (2006.01)
*G06F 11/00* (2006.01)

(52) U.S. Cl.
CPC .......... *G07C 5/0808* (2013.01); *B64D 45/00* (2013.01); *G06F 11/008* (2013.01); *B64D 2045/0085* (2013.01)

(58) Field of Classification Search
CPC ................. G07C 5/0808; B64D 45/00; B64D 2045/0085; G06F 11/008
(Continued)

(56) References Cited

U.S. PATENT DOCUMENTS

| 9,009,542 B1* | 4/2015 | Marr ................... G06F 11/0709 |
| | | 714/47.1 |
| 2003/0018928 A1* | 1/2003 | James .................... G05B 17/02 |
| | | 714/25 |

(Continued)

FOREIGN PATENT DOCUMENTS

| CN | 1533948 A | 10/2004 |
| CN | 101943911 A | 1/2011 |

(Continued)

OTHER PUBLICATIONS

Combined Search and Examination Report issued in connection with corresponding GB Application No. 1600237.0 dated Sep. 5, 2016.
(Continued)

*Primary Examiner* — James M McPherson
*Assistant Examiner* — Bakari Underwood
(74) *Attorney, Agent, or Firm* — Dority & Manning, P.A.

(57) ABSTRACT

Systems and methods to fuse aviation-related data systems for comprehensive aircraft system health monitoring are provided. One example method includes obtaining, by one
(Continued)

or more computing devices, fault data indicative of a plurality of fault indications provided by a first plurality of components of an aircraft. The method includes obtaining, by the one or more computing devices, condition indicators describing the respective operational conditions of a second plurality of components of the aircraft. The method includes fusing, by the one or more computing devices, the fault data with the condition indicators to form a comprehensive data set. The method includes identifying, by the one or more computing devices, one or more causes of the plurality of fault conditions based at least in part on the comprehensive data set. One example system includes a data fuser, a cause identifier, and an alert generator.

17 Claims, 6 Drawing Sheets

(58) Field of Classification Search
USPC .......................................................... 701/29
See application file for complete search history.

(56) References Cited

U.S. PATENT DOCUMENTS

| | | | |
|---|---|---|---|
| 2003/0167111 A1 | 9/2003 | Kipersztok et al. | |
| 2005/0207936 A1* | 9/2005 | Berryhill | B01D 53/9495 |
| | | | 422/63 |
| 2006/0085108 A1* | 4/2006 | Grier | G05B 23/0248 |
| | | | 714/E11.207 |
| 2007/0033277 A1* | 2/2007 | Yukawa | G05B 23/0267 |
| | | | 709/224 |
| 2007/0100519 A1 | 5/2007 | Engel | |
| 2007/0220368 A1 | 9/2007 | Jaw et al. | |
| 2008/0010005 A1* | 1/2008 | Small | G08G 5/00 |
| | | | 701/120 |
| 2010/0079258 A1* | 4/2010 | Ihn | G01N 29/043 |
| | | | 340/10.41 |
| 2010/0161274 A1* | 6/2010 | Leao | G05B 23/0243 |
| | | | 702/179 |
| 2011/0238258 A1 | 9/2011 | Singh et al. | |
| 2012/0053778 A1 | 3/2012 | Colvin et al. | |
| 2013/0268241 A1 | 10/2013 | Das et al. | |
| 2014/0324275 A1* | 10/2014 | Stanek | G07C 5/0816 |
| | | | 701/31.4 |
| 2015/0178998 A1* | 6/2015 | Attard | G07C 5/008 |
| | | | 701/23 |
| 2016/0350194 A1* | 12/2016 | Mohan | G06N 20/00 |
| 2017/0021914 A1* | 1/2017 | Small | B64C 13/16 |
| 2017/0186249 A1* | 6/2017 | Bandy | G07C 5/0816 |
| 2018/0047224 A1* | 2/2018 | Clark, IV | G07C 5/008 |

FOREIGN PATENT DOCUMENTS

| | | |
|---|---|---|
| CN | 102722722 A | 10/2012 |
| CN | 104149716 A | 11/2014 |
| CN | 104487962 A | 4/2015 |
| EP | 2063399 A2 | 5/2009 |
| GB | 2505061 A | 2/2014 |
| WO | 2013155161 A1 | 10/2013 |

OTHER PUBLICATIONS

Invitation To Pay Additional Fees issued in connection with corresponding PCT Application No. PCT/ EP2017/050162 dated May 15, 2017.
International Search Report and Written Opinion issued in connection with corresponding PCT Application No. PCT/EP2017/050162 dated Jul. 13, 2017.
International Preliminary Report on Patentability issued in connection with corresponding PCT Application No. PCT/EP2017/050162 dated Jul. 19, 2018.
Great Britain Office Action Corresponding to Application No. 1600237 dated Jun. 18, 2019.
Combined Chinese Search Report and Office Action Corresponding to Application No. 20178006034 dated Apr. 20, 2020.

* cited by examiner

FUSION OF AVIATION-RELATED DATA FOR COMPREHENSIVE AIRCRAFT SYSTEM HEALTH MONITORING

FIELD OF THE INVENTION

The present subject matter relates generally to aircraft health monitoring, and more particularly to fusion and analysis of aviation-related data systems for comprehensive aircraft system health monitoring.

BACKGROUND

Vast quantities of data related to performance tracking or health monitoring for aircraft assets are generally available. Analysis of such aircraft data can offer useful information for maintenance and prognostics for the aircraft.

In particular, modern aircraft are equipped with a large number of different computers that provide a wide range of control functions. Each computer typically outputs many different fault codes or other fault indications to indicate a range of internally detected potential fault conditions. Aircraft may also have a large number of sensors that provide fault indications or that provide data from which fault indications can be derived. In addition, the aircraft may generate various fault and warning messages.

Thus, modern aircraft typically output a very large number of fault indications. These fault indications require troubleshooting by maintenance personnel, for example, after or between flights. As such, maintenance personnel have only a brief period of time in which to determine a root cause of the fault indications and perform an appropriate response.

However, a workable system that enables the maintenance personnel to efficiently troubleshoot or otherwise comprehend and resolve the fault indications does not presently exist. In particular, many existing systems rely primarily on human interpretation and synthesis of these vast amounts of fault indications, which can be cumbersome, tedious, and time consuming.

In addition, a significant percentage of the fault indications output by aircraft control computers or other sensors can be spurious. For example, sensor faults may generate incorrect fault indications. Fault indications may also be triggered by aircraft flight conditions that are simply unusual, but that do not necessarily require maintenance. As such, system fault and warning messages can be triggered under particular flight conditions, but the faults are not repeatable during a ground test, resulting in a 'Ground test OK' followed by a repeat occurrence of the fault on the next flight. These false fault indications can cause a large amount of unnecessary maintenance effort and the incorrect removal of healthy components which are later determined to be 'no fault found'.

When faced with such overwhelming number of fault indications, many of which turn out to be specious or non-reproducible, maintenance personnel may simply ignore the fault indications, to the detriment of the aircraft health and safety. Alternatively, maintenance personnel may replace an entire part or system from which fault indications were received rather than perform troubleshooting to identify the particular component that requires maintenance. This undesirably adds to maintenance costs and is an inefficient solution.

Thus, known options for responding to aircraft fault indications can yield limited accuracy and effectiveness in making intelligent decisions about which maintenance actions to take and the urgency of taking those actions, resulting in increased maintenance costs.

BRIEF DESCRIPTION

Aspects and advantages of examples of the present disclosure will be set forth in part in the following description, or may be learned from the description, or may be learned through practice of the examples disclosed herein.

One example aspect of the present disclosure is directed to a computer-implemented method for monitoring aircraft system health. The method includes obtaining, by one or more computing devices, fault data indicative of a plurality of fault indications provided by a first plurality of components of an aircraft. The method includes obtaining, by the one or more computing devices, condition indicators representative of respective operational conditions of a second plurality of components of the aircraft. The method includes fusing, by the one or more computing devices, the fault data with the condition indicators to form a comprehensive data set. The method includes identifying, by the one or more computing devices, one or more causes of the plurality of fault conditions based at least in part on the comprehensive data set.

Another example aspect of the present disclosure is directed to an aircraft health monitoring system. The system includes one or more processors and one or more memory devices that store instructions executable by the one or more processors. Execution of the instructions by the one or more processors causes the aircraft health monitoring system to obtain fault data indicative of a plurality of fault indications provided by a first plurality of components of an aircraft. Execution of the instructions by the one or more processors causes the aircraft health monitoring system to obtain condition indicators representative of respective operational conditions of a second plurality of components of the aircraft. Execution of the instructions by the one or more processors causes the aircraft health monitoring system to detect one or more anomalous features exhibited by the condition indicators. Execution of the instructions by the one or more processors causes the aircraft health monitoring system to identify one or more causes of the plurality of fault indications based at least in part on the one or more anomalous features exhibited by the condition indicators.

Another example aspect of the present disclosure is directed to a computer-implemented system for monitoring aircraft system health. The system includes at least one processor. The system is configured to obtain fault data indicative of a plurality of fault indications provided by a first plurality of components of an aircraft. The system is configured to obtain condition indicators representative of respective operational conditions of a second plurality of components of the aircraft. The system is configured to fuse the fault data with the condition indicators to form a comprehensive data set. The system is configured to identify one or more causes of the plurality of fault conditions based at least in part on the comprehensive data set.

Variations and modifications can be made to these example aspects of the present disclosure.

These and other features, aspects and advantages of various examples will become better understood with reference to the following description and appended claims. The accompanying drawings, which are incorporated in and constitute a part of this specification, illustrate examples of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
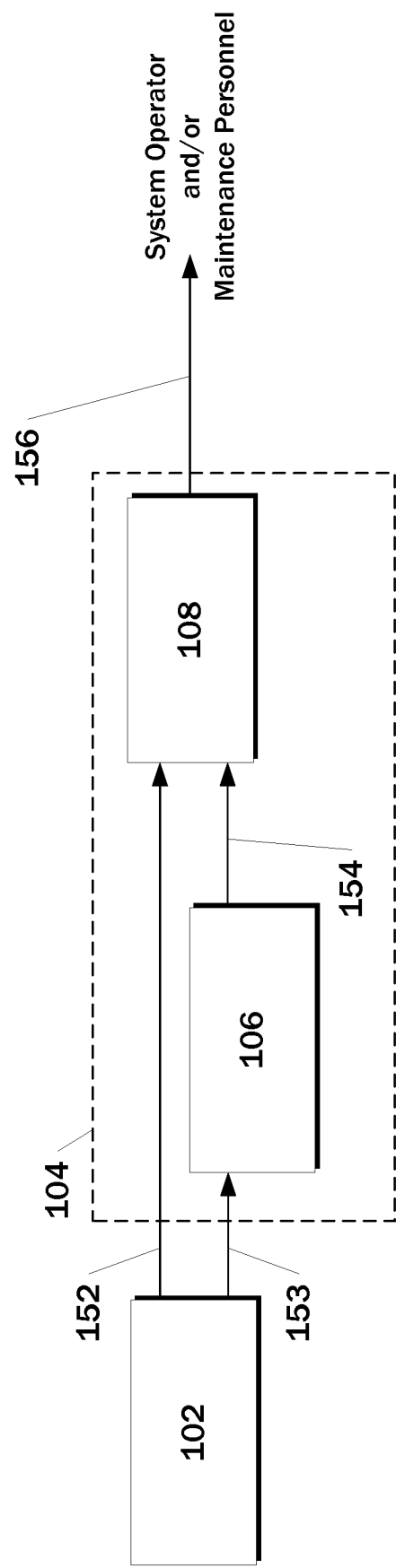
FIG. 1 depicts an overview of an example aircraft health monitoring system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for fusing data from aviation-related data systems for automated comprehensive aircraft system health monitoring. For example, the systems and methods of the present disclosure can combine fault data such as fault codes or other fault indications with derived condition indicators that describe the responses of various aircraft components to control signals to form a comprehensive data set. The systems and methods of the present disclosure can analyze the comprehensive data set to identify one or more causes of the fault indications. For example, automated reasoning technologies such as pattern matching, step-wise logic processes, or other logical or probabilistic techniques can be applied to the comprehensive data set to identify the one or more causes of the fault indications. Further, in some implementations, an alert that describes the one or more causes can be provided for display, for example, to maintenance personnel associated with the aircraft.

More particularly, in some implementations of the present disclosure, a data collection system that is on-board the aircraft can continuously record data that describes various aspects of operation of the aircraft system. For example, the data can include both fault data and system response data. The fault data can describe various fault indications provided by various components of the aircraft, while the condition indicators describe the operational response of the aircraft and its systems.

In some implementations, the data collection system can communicate the collected data to an aircraft health monitoring system that is ground-based. For example, the fault data and the system response data can be communicated periodically during flight or as bulk transfer after aircraft landing. In other implementations, the aircraft health monitoring system is physically located on the aircraft and, in some instances, can receive and process the fault data and the system response data in real time.

As examples, the fault data can include fault codes or other fault indications that are provided by flight control computers, proximity sensors, actuators, or other aircraft components. Additional computer fault data can include fault and warning messages generated on the aircraft. Further, in some instances, fault indications can be derived from various flight data parameters, including discrete parameters.

As noted above, the condition indicators can describe the operation and performance of various aircraft systems, components, or of the aircraft as a whole. As examples, condition indicators can be derived from continuous parameters such as control surface positions, temperatures, pressures, flow rates, or other operational conditions of various aircraft components. This continuous parameter data is indicative of respective continuous operational conditions of various aircraft components. For example, the continuous parameter data can be a continuously recorded analog signal.

The systems and methods of the present disclosure can fuse the fault data and the condition indicators to form a comprehensive data set. As one example, the fault data and the condition indicators can be combined in a single database and indexed according to time. Thereafter, logic-based, probabilistic, or other automated reasoning techniques can be applied to the comprehensive data set to provide an automated fault diagnosis that identifies one or more root causes of the fault indications.

In some implementations, in addition or alternatively to the fusion of condition indicators with fault data, the systems and methods of the present disclosure can analyze the condition indicators prior to fusion to detect one or more features exhibited by the condition indicators. For example, features related to system status, performance, and/or health can be derived from continuously recorded flight data in a range of different flight conditions (e.g. on-ground pre-flight, take-off, climb, cruise, descent, landing, on-ground post-flight). The derived features can be analyzed using statistical and other methods to identify anomalous features that correspond to, for example, anomalous system performance or the presence of a potential fault condition. The derived features (e.g., the identified anomalous features) can then be fused with the fault data to form the comprehensive data set, as described above.

In such fashion, the systems and methods described herein can correlate new aircraft system performance, health, and fault information derived from continuously recorded aircraft flight data with the existing fault data (e.g., existing fault and warning messages generated by the different aircraft systems) to provide a comprehensive data set useful for system health monitoring and fault diagnosis. In particular, creation of such a comprehensive data set can provide new insights into system health and performance and assist the systems and methods of the present disclosure in delivering enhanced fault detection and diagnosis.

According to another aspect of the present disclosure, in some implementations, the fault data can be collected from a set of controller devices (e.g., flight control computers or other controllers) while the condition indicators are derived from data collected from a set of components that are respectively controlled by the set of controller devices. In particular, computer and controller fault information can be collected by processing continuously recorded fault discretes and/or analyzing aircraft faults and warnings messages. Features related to the various system or component responses to control inputs can also be extracted from continuously recorded flight data using various processing techniques. These derived features can then be analyzed using statistical and other methods to characterize the respective system or component responses to respective control signals provided by the controller devices, and further to identify anomalous system operation. As such, new diagnostic and/or prognostic information can be generated by correlating computer or actuator-reported fault conditions with deviations between the expected and observed system response to control signals respectively provided by such computers or actuators.

According to another aspect of the present disclosure, in some implementations, the systems and methods of the present disclosure can include a time dimension in the analysis of the comprehensive aircraft data. For example, the previous fault indications (e.g., existing fault and warning messages) or other collected data for an aircraft can be fused or otherwise updated with new data downloaded from a current flight or downloaded after the completion of a recent flight. More particularly, fault signatures associated with certain root causes may tend to evolve over a period of weeks as a defect develops. Therefore, in some implementations, systems and methods of the present disclosure can perform analysis that builds up evidence over a series of flights, increasing the confidence in the diagnosis. As one example, for each instance in which the comprehensive data set evidences a potential cause for fault indications, a confidence score associated with such potential cause can be increased. When a confidence score for a particular cause exceeds a threshold value, the aircraft health monitoring system can issue an alert that identifies such particular cause and/or provides a list of tasks to remediate such cause.

Thus, the systems and methods of the present disclosure can fuse fault information (e.g. fault codes or other fault indications derived from discrete flight data parameters) from one or more computers or controllers with information on the response of components or systems controlled by these computers (e.g. responses derived from continuous flight data parameters) to provide comprehensive aircraft system health monitoring and diagnostics. As an example, automated reasoning technology can be applied to the comprehensive fused data set to reason about the behavior of the observed fault and system response information and automatically diagnose the root cause of detected fault symptoms.

In this way, example aspects of the present disclosure can have a technical effect of automatically providing a more accurate diagnosis of the root cause of fault indications provided by aircraft system components, thereby reducing troubleshooting time, minimizing repeated cycles of a fault indication being triggered in flight followed by a 'ground test OK', and reducing removed component no fault found rates. In addition, extracting and combining all available information from different data sources maximizes the potential to accurately detect and diagnose different aircraft system faults. This provides both technical and commercial benefits to airlines by minimizing operational disruption due to technical causes and improving maintenance efficiency. Therefore, the systems and methods of the present disclosure maintain flight safety while reducing maintenance cost.

Furthermore, the systems and methods of the present disclosure have been proven to effectively identify causes of fault indications through an analysis of historical flight data and corresponding maintenance reports. In particular, the systems and methods of the present disclosure were applied to historical flight data (e.g., historical fault data and continuous flight data parameters) to identify causes of the faults contained within such historical flight data. The identified causes and correspondingly suggested maintenance tasks were then compared to maintenance records for the corresponding aircraft. The fault diagnoses provided by the systems and methods of the present disclosure were validated by the historical maintenance data.

Example aspects of the present disclosure are discussed with reference to aircraft related data and other avionic systems associated with an aircraft for purposes of illustration and discussion. Those of ordinary skill in the art, using the disclosures provided herein, will understand that the subject matter described herein can be used with other vehicles, machines, mechanical assets, or other systems without deviating from the scope of the present disclosure.

With reference now to the Figures, example aspects of the present disclosure will be discussed in further detail.

FIG. 1 depicts an overview of an example aircraft health monitoring system 104 according to example embodiments of the present disclosure. The aircraft health monitoring system 104 is operable to receive various data from one or more aircraft components 102. For example, as illustrated in FIG. 1, the data received from the components 102 can include both fault data 152 and continuous flight data parameters 153.

More particularly, in some implementations of the present disclosure, a data collection system that is on-board the aircraft can continuously record data that describes various aspects of operation of the aircraft system. For example, the data can include both fault data 152 and continuous flight data parameters 153. The fault data 152 can describe various fault indications provided by various components of the aircraft, while the continuous flight data parameters 153 describes various continuous operational conditions for the aircraft. The data collection system can be a component of the aircraft health monitoring system 104 or can be a separate component that performs data collection and data communication functions.

In some implementations, the data collection system can communicate the collected data to an aircraft health monitoring system 104 that is ground-based. For example, the fault data 152 and the continuous flight data parameters 153 can be communicated periodically during flight or as bulk transfer after aircraft landing. In other implementations, the aircraft health monitoring system 104 is physically located on the aircraft and, in some instances, can receive and process the fault data 152 and the continuous flight data parameters 153 in real time.

In some implementations, the aircraft health monitoring system 104 maintains data for a plurality of different aircraft over a significant number of flights for each aircraft. In such implementations, data 152 and 153 can include an aircraft identifier that allows the data 152 and 153 to be associated with the correct aircraft.

As examples, the fault data 152 can include fault codes or other fault indications that are provided by flight control computers, proximity sensors, actuators, or other aircraft components. For example, proximity sensors on thrust reversers may provide fault data 152. Additional computer fault data 152 can include fault and warning messages generated on the aircraft. Further, in some instances, fault indications can be derived from various flight data parameters, including discrete parameters.

As noted above, the continuous flight data parameters 153 can describe the operation and performance of various aircraft systems, components, or of the aircraft as a whole. As examples, the continuous flight data parameters 153 can describe control surface (e.g., flaps, rudders, etc.) positions/angles, temperatures, pressures, flow rates, tank levels, engine speed, altitude, weight on wheels, airspeed, or other operational conditions of various aircraft components.

In some implementations, the aircraft health monitoring system 104 includes a response derivation component 106 that derives one or more condition indicators 154 from the continuous flight data parameters 153. For example, the condition indicators 154 can describe the responses of various aircraft components and systems to control signals.

The aircraft health monitoring system 104 can further include one or more data fusion and analysis component(s) 108 that fuse the fault data 152 and the condition indicators 154 to form a comprehensive data set for each monitored aircraft. As one example, the fault data 152 and the condition indicators 154 can be combined in a single database and indexed according to time. Thereafter, the aircraft health monitoring system 104 can apply logic-based, probabilistic, or other automated reasoning techniques to the comprehensive data set to provide an automated fault diagnosis that identifies one or more root causes of the fault indications.

In some implementations, in addition or alternatively to the fusion of condition indicators with fault indications, the aircraft health monitoring system 104 can analyze the condition indicators 154 prior to fusion to detect one or more features exhibited by the condition indicators 154. For example, features related to system status, performance, and/or health can be derived from continuously recorded flight data in a range of different flight conditions (e.g. on-ground pre-flight, take-off, climb, cruise, descent, landing, on-ground post-flight). The derived features can be analyzed using statistical and other methods to identify anomalous features that correspond to, for example, anomalous system performance or the presence of a potential fault condition. The derived features (e.g., the identified anomalous features) can then be fused with the fault data 152 to form the comprehensive data set, as described above.

In such fashion, the aircraft health monitoring system 104 can correlate new aircraft system performance, health, and fault information derived from continuously recorded aircraft flight data 153 with the existing fault data 152 (e.g., existing fault and warning messages generated by the different aircraft systems) to provide a comprehensive data set useful for system health monitoring and fault diagnosis. In particular, creation of such a comprehensive data set can provide new insights into aircraft system health and performance and assist the aircraft health monitoring system 104 in delivering enhanced fault detection and cause diagnosis.

After identifying one or more causes of the fault indications included in the fault data 152, the aircraft health monitoring system 104 can output one or more alerts 156 that describe the one or more identified causes. The alerts 156 can be provided (e.g., displayed or printed) to a system operator and/or maintenance personnel of the aircraft. The alert 156 can indicate the cause and/or provide a task list of practical maintenance tasks to resolve the cause.

According to another aspect of the present disclosure, in some implementations, the fault data 152 can be collected from a set of controller devices (e.g., flight control computers or other controllers) while the continuous flight data parameters 153 is collected from a set of controlled components that are respectively controlled by the set of controller devices.

Figure 2:
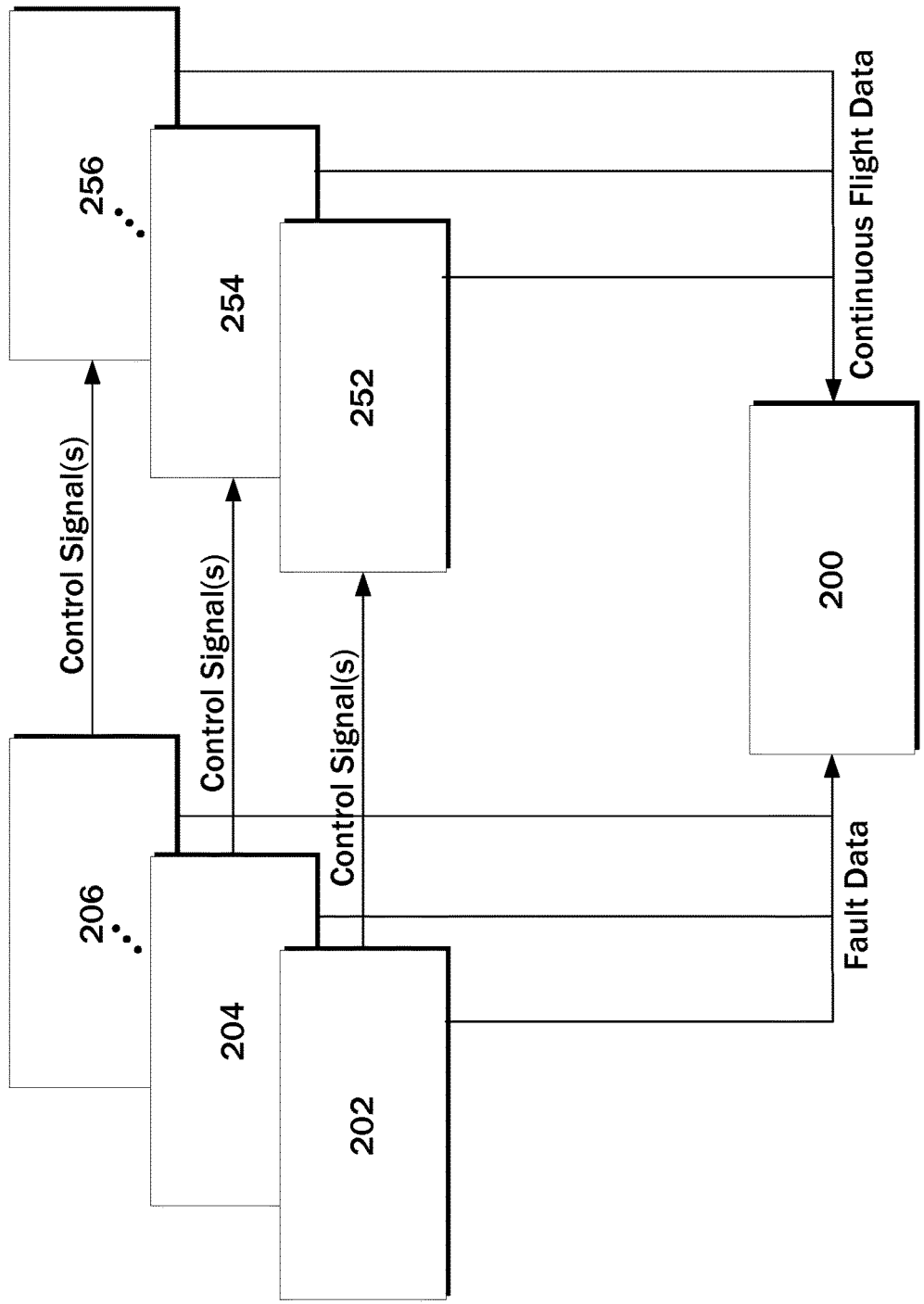
FIG. 2 depicts a collection of data from aircraft components by an example aircraft health monitoring system according to example embodiments of the present disclosure.

As an example, FIG. 2 depicts a collection of data from aircraft components by an example aircraft health monitoring system 200 according to example embodiments of the present disclosure. In particular, the aircraft health monitoring system 200 is illustrated as collecting fault data from a plurality of controller components 202-206 and continuous flight data from a plurality of controlled components 252-262. The controller components 202-206 respectively control (e.g., through the use of control signals) the controlled components 252-256, as illustrated.

In some implementations, fault data can be collected from the controller components 202-206 by processing continuously recorded fault discretes and/or analyzing aircraft faults and warnings messages. In addition, features related to the various responses of the controlled components 252-256 to the respective control signals can also be extracted from the continuously recorded flight data using various processing techniques. These derived features can then be analyzed using statistical and other methods to characterize the respective responses of the controlled components 252-256 to the respective control signals provided by the controller devices 202-206, and further to identify anomalous system operation. As such, new diagnostic and/or prognostic information can be generated by correlating controller component fault conditions with deviations between the expected and observed controlled component response to control signals respectively provided by such controller components.

As one example, an example aircraft may have several fuel tanks in the center and wings of the aircraft. Fuel is pumped between the fuel tanks to balance the center of gravity of the aircraft and feed the engines. Respective valves between the tanks may be monitored by discretes corresponding to open/closed, while the quantities of fuel in the tanks are monitored by level gauges which give continuous signals. A correctly operating fuel valve should be indicated by: (1) a discrete control signal commanding the valve to open; (2) a change in state of the valve from closed to open; (3) an increase in level in one tank; and (4) a reduction in level of the reserve tank. If indications 1, 3, and 4 are present, but not 2, the aircraft health monitoring system 200 can detect that there is a problem in the sensor detecting whether the valve has opened. However, if indication 1 is present, but not 2, 3, and 4, the aircraft health monitoring system 200 can detect that there is a faulty valve. Thus, deviations between the expected and observed controlled component response to control signals can be used to provide root cause diagnosis.

According to yet another aspect of the present disclosure, in some implementations, the aircraft health monitoring system 200 can derive the response of certain controlled components (e.g., controlled components 252-256) based on data associated with certain additional components that reflects the response of the controlled components. As an example, the controller component 202 can control the controlled component 252, which may be, for example, an actuator using control signals. The actuator may be operable to move a flap. The aircraft may also have a number of sensors that provide data regarding the position of the flap. In such example, the aircraft health monitoring system 200 can derive the response of the controlled components 252 (e.g., the actuator) to the control signals from the controller component 202 based on the data from the additional sensors that describe the position of the flap.

Figure 3:
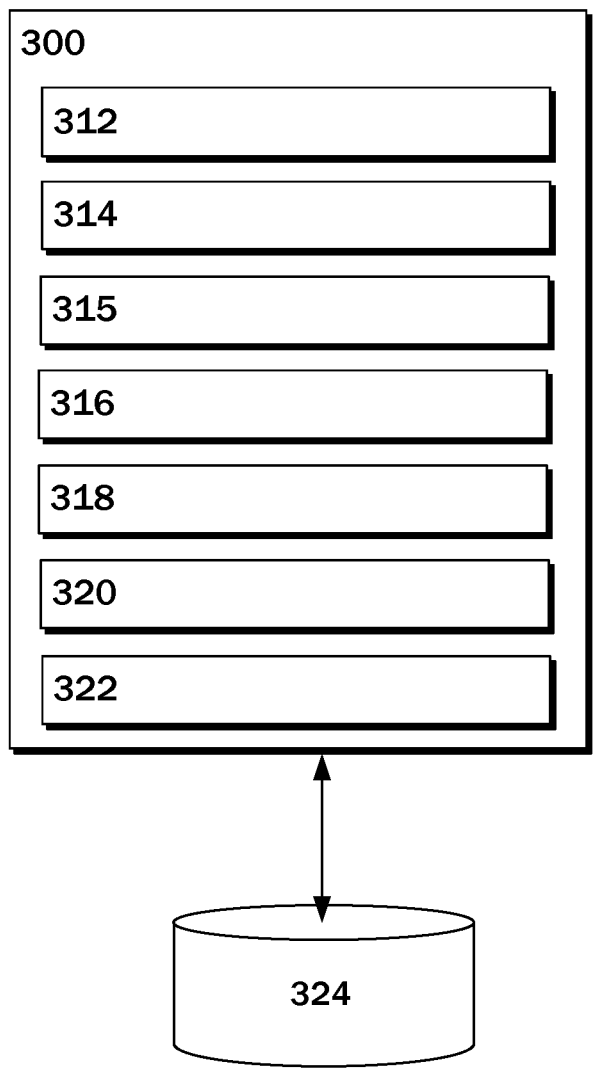
FIG. 3 depicts a block diagram of an example aircraft health monitoring system according to example embodiments of the present disclosure.

FIG. 3 depicts a block diagram of an example aircraft health monitoring system 300 according to example embodiments of the present disclosure. The system 300 can operate to implement aspects of the present disclosure, including data fusion and automated root cause diagnosis.

The aircraft health monitoring system 300 includes one or more processor(s) 312 and one or more memory devices 314. The one or more processor(s) 312 can include any suitable processing device, such as a microprocessor, microcontroller, integrated circuit, logic device, one or more central processing units (CPUs), and/or other processing devices.

The one or more memory devices 314 can include one or more computer-readable media, including, but not limited to, non-transitory computer-readable media, RAM, ROM, hard drives, flash drives, or other memory devices. In some examples, memory devices 314 can correspond to coordinated databases that are split over multiple locations.

The one or more memory devices 314 store information accessible by the one or more processors 312, including instructions that can be executed by the one or more processors 312. For instance, memory device 314 or other components of the system 300 can store instructions for implementing processing automated reasoning rules, operations, techniques, and/or algorithms for performing various functions disclosed herein.

The aircraft health monitoring system 300 can further include a condition indicator deriver 315, a data fuser 316, a cause identifier 318, an alert generator 320, and a network interface 322.

The aircraft health monitoring system 300 can implement the condition indicator deriver 315 to derive various condition indicators from flight data, such as continuous flight data parameters.

The aircraft health monitoring system 300 can implement the data fuser 316 to fuse received data to form a comprehensive data set. For example, the data fuser 316 can be implemented to receive various streams, types, or forms of data and fuse such data to form the comprehensive data set. In one example, all received data can be stored in a single data structure (e.g., database) and indexed according to time. Thus, for example, condition indicators occurring at a particular time can be fused to or otherwise matched with fault data that occurred at such particular time.

As an example, the aircraft health monitoring system 300 can be communicatively connected to a database 324 that stores the comprehensive aircraft data set. The database 324 can be a single database or multiple databases that are communicatively connected. The database 324 can have any of various types of data structures or database schemes.

The aircraft health monitoring system 300 can implement the cause identifier 318 to analyze the comprehensive aircraft data set to identify one or more causes of various fault indications included in the data set. The cause identifier 318 can implement a number of automated reasoning technologies or other algorithms to identify the one or more causes.

As an example, in some implementations, historical data from other aircraft (e.g., maintenance logs or other available information) is manually analyzed to identify patterns that correspond to various root causes of fault indications. The cause identifier 318 can then implement one or more algorithms to search the fused data for the presence of such patterns. As an example, the cause identifier 318 can implement an algorithm to determine whether a number of parameters satisfy certain pattern conditions, which correspond to one of the patterns. For example, the cause identifier 318 can determine whether a number of parameters exceed certain respective thresholds, which correspond to one of the patterns.

In another example, the cause identifier 318 can apply a logic tree or other step-wise logic process to the fused data to work towards identifying a potential root cause. The step-wise logic process can gradually home in on the root cause of the fault indications.

Thus, the cause identifier 318 can implement various forms of automated reasoning technology, including, for example, the application of rules to a body of aircraft data to identify whether certain predefined patterns are exhibited by the data. Once a pattern is identified, a corresponding root cause/actionable maintenance task is output for the maintenance crew to perform.

More particularly, the aircraft health monitoring system 300 can implement the alert generator 320 to generate one or more alerts that describe the one or more identified causes. The alerts can be provided (e.g., displayed or printed) to a system operator and/or maintenance personnel of the aircraft. The alerts can indicate the identified cause(s) and/or provide a task list of practical maintenance tasks to resolve the cause.

Each of the condition indicator deriver 315, the data fuser 316, the cause identifier 318, and the alert generator 320 include computer logic utilized to provide desired functionality. Thus, each of the condition indicator deriver 315, the data fuser 316, the cause identifier 318, and the alert generator 320 can be implemented in hardware, application specific circuits, firmware and/or software controlling a general purpose processor. In one embodiment, each of the condition indicator deriver 315, the data fuser 316, the cause identifier 318, and the alert generator 320 are program code files stored on a storage device, loaded into memory and executed by a processor or can be provided from computer program products, for example computer executable instructions, that are stored in a tangible computer-readable storage medium such as RAM, hard disk or optical or magnetic media. The condition indicator deriver 315, the data fuser 316, the cause identifier 318, and the alert generator 320 can each correspond to one or more different programs, files, circuits, or sets of instructions. Likewise, two or more of the condition indicator deriver 315, the data fuser 316, the cause identifier 318, and the alert generator 320 can be combined into a single program, file, circuit, or set of instructions.

The network interface 322 can include any components or configuration suitable for communication with other computing devices over a network, including, for example, one or more ports, transmitters, wireless cards, controllers, physical layer components, or other items for communication according to any currently known or future developed communications protocol or technology, including aircraft to ground communications technologies.

Figure 4:
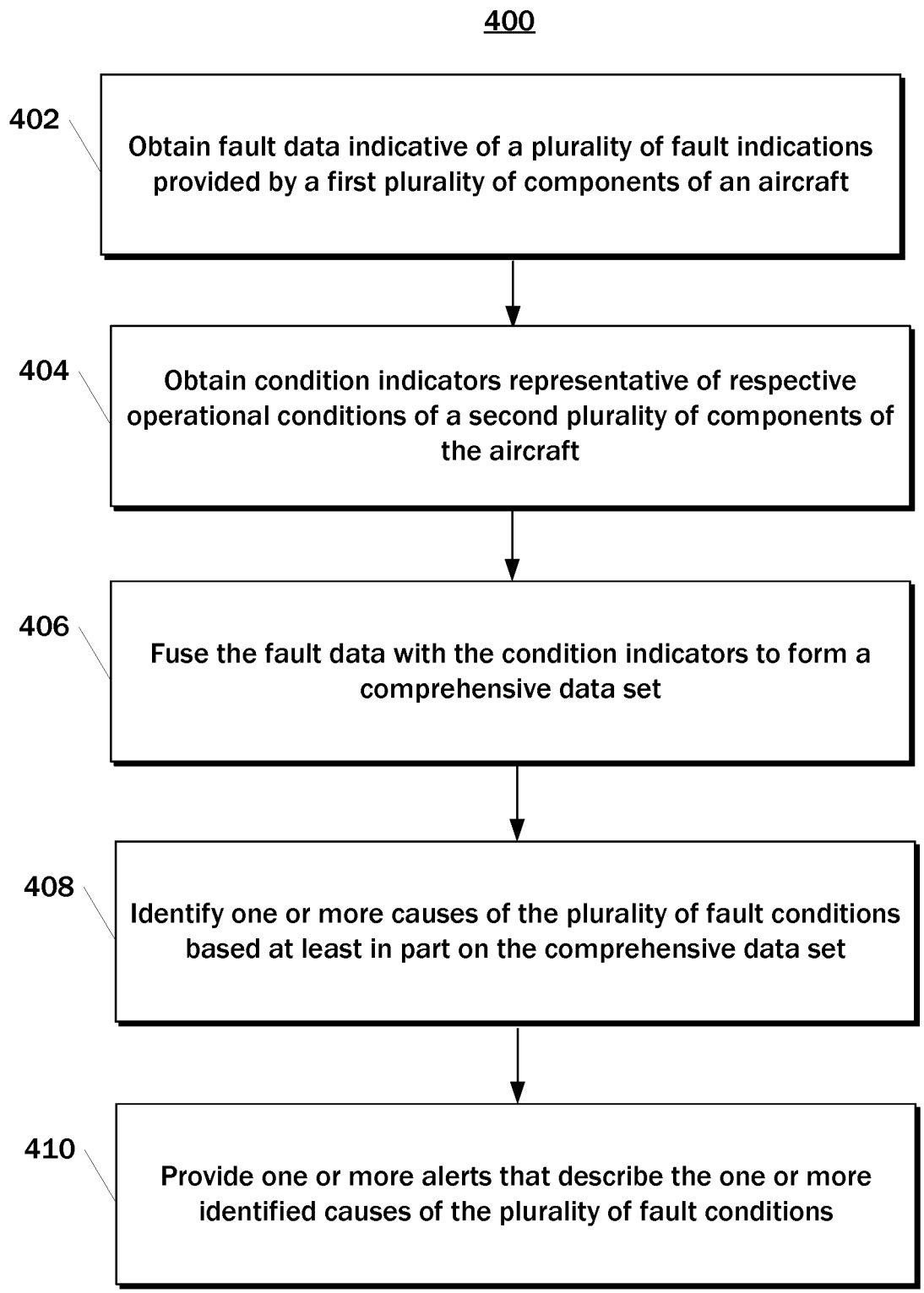
FIG. 4 depicts a flow chart diagram of an example method for monitoring aircraft system health according to example embodiments of the present disclosure.

FIG. 4 depicts a flow chart diagram of an example method (400) for monitoring aircraft system health according to example embodiments of the present disclosure. The method (400) can be implemented by any of the aircraft health monitoring systems disclosed herein or other similar systems.

At (402), the system obtains fault data indicative of a plurality of fault indications provided by a first plurality of components of an aircraft. For example, the fault data can be received during flight or in a bulk transfer after flight conclusion.

In some implementations, obtaining the fault data at (402) can include obtaining at least one of: fault codes provided by flight control computers and fault data derived from discrete flight data parameters.

At (404), the system obtains condition indicators indicative of respective operational conditions of a second plurality of components of the aircraft. In some implementations, obtaining the condition indicators at (404) can include obtaining, by the one or more computing devices, continuous parameter data indicative of respective continuous operational conditions of the second plurality of components of the aircraft. In such implementations, obtaining the condition indicators at (404) can further include determining, based at least in part on the continuous parameter data, condition indicators representative of respective responses of the second plurality of components to respective control signals respectively provided to the second plurality of components. Thus, the condition indicators can be derived from the continuous flight parameter data at (404).

As an example, in some implementations, obtaining the fault data at (402) can include obtaining the fault data from a plurality of flight control computers that respectively control the second plurality of components; and obtaining the condition indicators at (404) can include deriving condition indicators representative of respective responses of the second plurality of components to respective control signals respectively provided to the second plurality of components by the plurality of flight control computers.

As another example, in some implementations, the second plurality of components can include one or more flight control actuators. In such implementations, obtaining the condition indicators at (404) can include obtaining continuous parameter data indicative of flight control surface movement of the aircraft; and determining the respective responses of the one or more flight control actuators to the respective control signals based at least in part on the continuous parameter data indicative of the flight control surface movement.

At (406), the system fuses the fault data and the condition indicators to form a comprehensive data set. For example, the fault data and the condition indicators can be combined to form a single data source indexed based on time.

At (408), the system identifies one or more causes of the plurality of fault conditions based at least in part on the comprehensive data set. In some implementations, identifying the one or more causes at (408) can include applying automated reasoning technology to the comprehensive data set to identify the one or more causes.

As another example, in some implementations, identifying the one or more causes at (408) can include identifying one or more patterns exhibited by the comprehensive data set, where the one or more patterns have been previously determined to be associated with the one or more causes. For example, identifying the one or more patterns can include determining that a first plurality of parameters described by the comprehensive data set respectively satisfy a first plurality of pattern conditions. For example, the pattern conditions can include respective parameter thresholds.

As yet another example, in some implementations, identifying the one or more causes at (408) can include executing a step-wise logic process based at least in part on the comprehensive data to identify the one or more causes.

At (410), the system provides one or more alerts that describe the one or more identified causes of the plurality of fault conditions. For example, the alerts can be provided to a system operator or can be provided directly to maintenance personnel.

Figure 5:
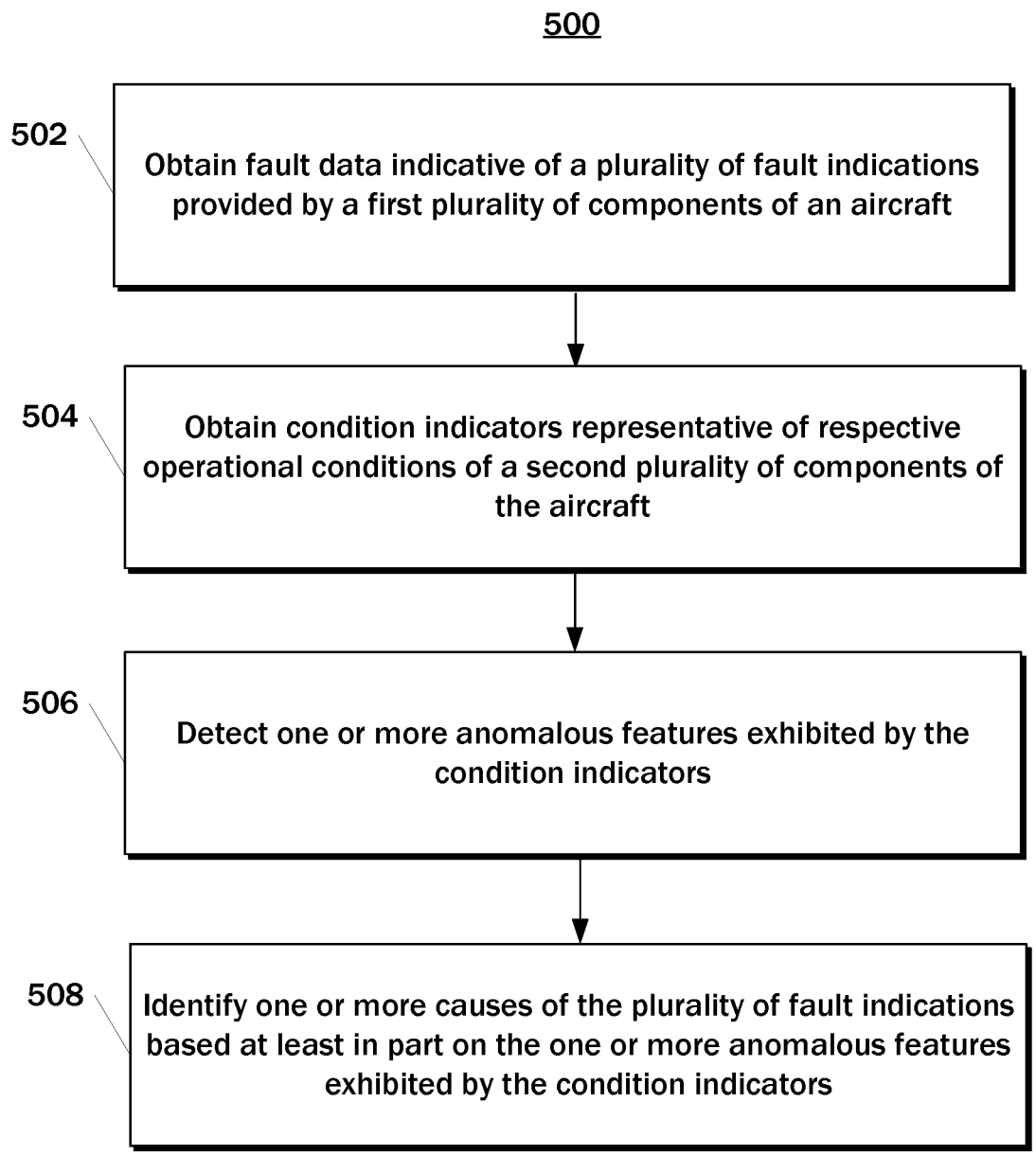
FIG. 5 depicts a flow chart diagram of an example method for monitoring aircraft system health according to example embodiments of the present disclosure.

FIG. 5 depicts a flow chart diagram of an example method (500) for monitoring aircraft system health according to example embodiments of the present disclosure. The method (500) can be implemented by any of the aircraft health monitoring systems disclosed herein or other similar systems At (502), the system obtains fault data indicative of a plurality of fault indications provided by a first plurality of components of an aircraft. For example, the fault data can be received during flight or in a bulk transfer after flight conclusion.

At (504), the system obtains condition indicators representative of respective operational conditions of a second plurality of components of the aircraft. For example, the condition indicators can be derived during flight or from a bulk transfer after flight conclusion. The condition indicators may be derived from continuous parameter data indicative of respective continuous operational conditions of the second plurality of components of the aircraft.

At (506), the system detects one or more anomalous features exhibited by the conditionindicators. As one example, features related to the various system or component responses to control inputs can be extracted from continuously recorded flight data using various processing techniques. These derived features can then be analyzed using statistical and other methods to characterize the respective system or component responses to respective control signals provided by the controller devices, and further to identify anomalous system operation. Thus, various features derived from condition indicators can be analyzed using statistical and other methods to identify anomalous features that correspond to, for example, anomalous system performance or the presence of a potential fault condition.

At (508), the system identifies one or more causes of the plurality of fault indications based at least in part on the one or more anomalous features exhibited by the condition indicators.

In some implementations, to identify the one or more causes at (508), the system fuses the one or more anomalous features and the fault data to generate a comprehensive data set and then identifies the one or more causes of the plurality of fault conditions based at least in part on the comprehensive data set.

For example, in some implementations, to identify the one or more causes based at least in part on the comprehensive data set, the system automatically applies logic-based or probabilistic reasoning to the comprehensive data set to identify the one or more causes of the plurality of fault indications.

As another example, in some implementations, to identify the one or more causes at (508), the system accesses one or more rules that describe previously established relationships between anomalous feature behavior, specific fault indications, and causes of fault indications. The system then applies the one or more rules to the comprehensive data set to identify the one or more causes of the plurality of fault conditions. Alerts can be generated that describe the one or more causes, as described above.

According to another aspect of the present disclosure, in some implementations, the systems and methods of the present disclosure can include a time dimension in the analysis of the comprehensive aircraft data. For example, the previous fault indications (e.g., existing fault and warning messages) or other collected data for an aircraft can be fused or otherwise updated with new data downloaded from a current flight or downloaded after the completion of a recent flight.

More particularly, fault signatures associated with certain root causes may tend to evolve over a period of weeks as a defect develops. Therefore, in some implementations, systems and methods of the present disclosure can perform analysis that builds up evidence over a series of flights, increasing the confidence in the diagnosis. As one example, for each instance in which the comprehensive data set evidences a potential cause for fault indications, a confidence score associated with such potential cause can be increased. When a confidence score for a particular cause exceeds a threshold value, the aircraft health monitoring system can issue an alert that identifies such particular cause and/or provides a list of tasks to remediate such cause.

Figure 6:
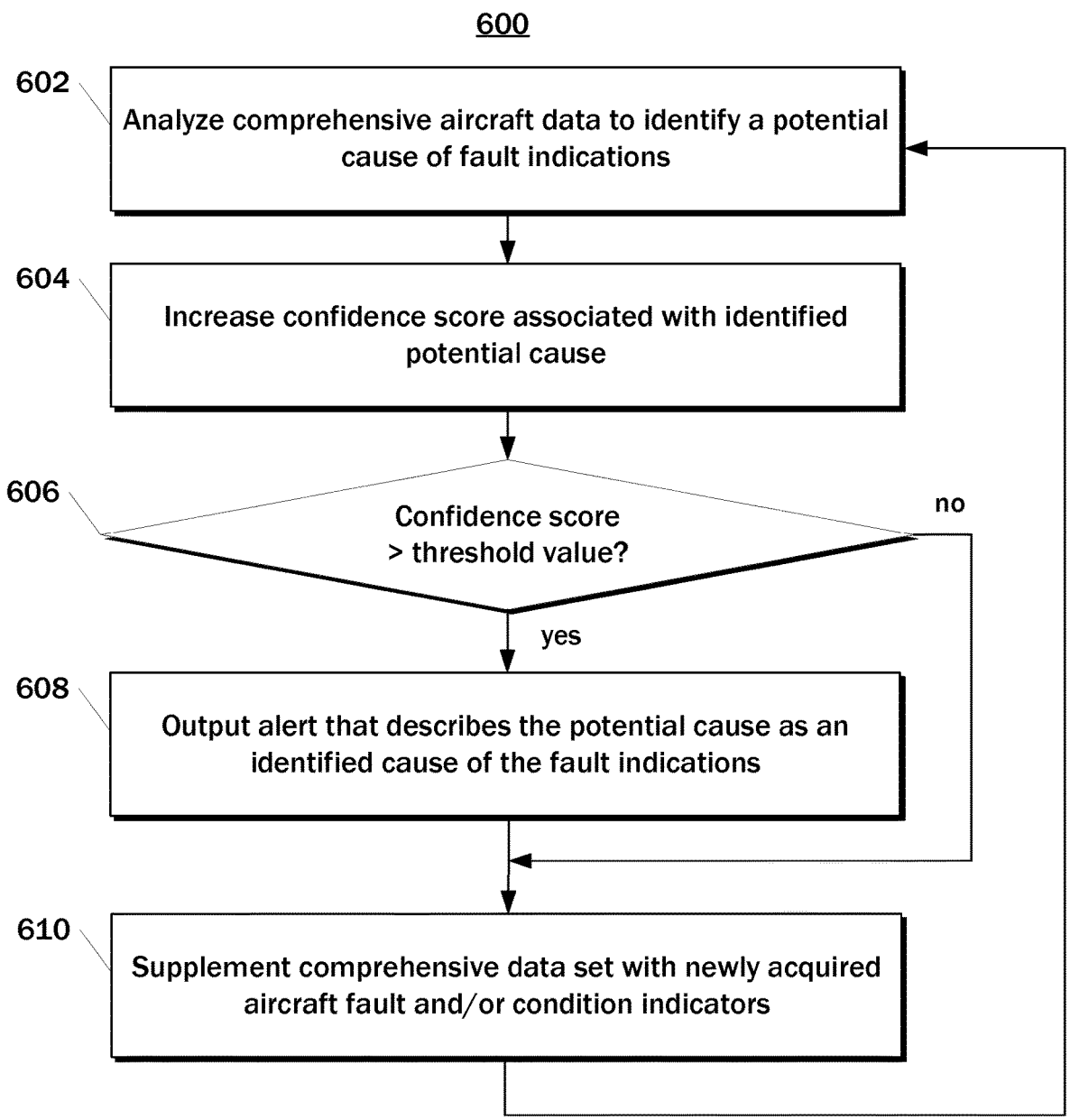
FIG. 6 depicts a flow chart diagram of an example method for monitoring aircraft system health according to example embodiments of the present disclosure.

As one example, FIG. 6 depicts a flow chart diagram of an example method (600) for monitoring aircraft system health according to example embodiments of the present disclosure.

At (602), the system analyzes comprehensive aircraft data to identify a potential cause of one or more fault indications. For example, the various automated reasoning techniques described above can be applied to a comprehensive aircraft data set to identify one or more potential causes of one or more fault indications. In particular, in some implementations, the comprehensive data set can include data compiled for a given aircraft over a significant number of flights.

At (604), the system increases a confidence score associated with the potential cause identified at (602). In some implementations, each confidence score is increased by standard set amount. In other implementations, the degree to which the evidence indicates a potential cause can be assessed and the confidence score can be increased by an amount that is proportional to such degree.

At (606), the system determines whether the confidence score is greater than a threshold value. In some implementations, the threshold value can be the same for all potential causes. In other implementations, the threshold value for each potential cause can be different and can be based, for example, on an analysis of historical aircraft data.

If the system determines at (606) that the confidence score is greater than the threshold value, then method (600) proceeds to (608). However, if the system determines at (606) that the confidence score is not greater than the threshold value, then method (600) bypasses (608) and proceeds directly to (610).

At (608), the system outputs an alert that describes the cause as an identified cause of one or more fault indications provided by components of the aircraft. Thus, when a confidence score for a particular cause exceeds a threshold value, the aircraft health monitoring system can issue an alert that identifies such particular cause and/or provides a list of tasks to remediate such cause. After (608), method (600) proceeds to (610).

At (610), the system supplements comprehensive data set with newly acquired aircraft fault and/or condition indicators. For example, new fault and/or condition indicators from on-going aircraft flights can be added to the comprehensive data set, so that the comprehensive data set reflects changing faults and conditions at the aircraft over time.

After (610), the system returns to (602) and again analyzes the comprehensive aircraft data to identify a potential cause of one or more fault indications. Thus, method (600) can include analysis that builds up evidence/confidence over a series of flights, increasing the reliability and specificity of the diagnosis.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

It will be appreciated that the computer-executable algorithms and techniques described herein can be implemented in hardware, application specific circuits, firmware and/or software controlling a general purpose processor. In one embodiment, the algorithms or computer-implemented techniques are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the algorithm or technique.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What we claim is:

1. A computer-implemented method for monitoring aircraft system health, the method comprising:
    obtaining, by one or more computing devices, fault data indicative of a plurality of fault indications provided by a first plurality of components of an aircraft;
    obtaining, by the one or more computing devices, condition indicators representative of respective operational conditions of a second plurality of components of the aircraft;
    fusing, by the one or more computing devices, the fault data with the condition indicators to form a comprehensive data set;
    identifying, by the one or more computing devices, one or more root causes of the plurality of fault conditions based at least in part on the comprehensive data set;
    generating, by the one or more computing devices, one or more alerts that describe the one or more root causes of the plurality of fault conditions; and
    providing, by the one or more computing devices, the one or more alerts for display to maintenance personnel associated with the aircraft, and wherein the identifying, by the one or more computing devices, the one or more root causes of the plurality of fault conditions comprises:
identifying, by the one or more computing devices, each instance the comprehensive data set evidences a potential cause of the plurality of fault conditions, the comprehensive data set being supplemented over time with additional fault data or additional condition indicator data;
increasing, by the one or more computing devices, a confidence score associated with the potential cause for each instance the comprehensive data set evidences the potential cause, wherein increasing the confidence score indicates an increased likelihood that the potential cause is an identified cause of the plurality of fault indications;
determining, by the one or more computing devices, after the confidence score is increased, whether the confidence score exceeds a threshold value; and
in response to the confidence score exceeding the threshold value, outputting, by the one or more computing devices, an alert that describes the potential cause as the identified cause of the fault indications, the alert being one of the one or more alerts.

2. The method of claim 1, wherein obtaining, by the one or more computing devices, the fault data comprises obtaining, by the one or more computing devices, at least one of: fault codes provided by flight control computers and fault data derived from discrete flight data parameters.

3. The method of claim 1, wherein obtaining, by the one or more computing devices, the condition indicators comprises:
obtaining, by the one or more computing devices, continuous parameter data indicative of respective continuous operational conditions of the second plurality of components of the aircraft; and
deriving, by the one or more computing devices based at least in part on the continuous parameter data, the condition indicators representative of respective responses of the second plurality of components to respective control signals respectively provided to the second plurality of components.

4. The method of claim 1, wherein:
obtaining, by the one or more computing devices, the fault data comprises obtaining, by the one or more computing devices, the fault data from a plurality of flight control computers that respectively control the second plurality of components; and
obtaining, by the one or more computing devices, the condition indicators comprises:
obtaining, by the one or more computing devices, continuous flight data indicative of respective responses of the second plurality of components to respective control signals respectively provided to the second plurality of components by the plurality of flight control computers; and
deriving, by the one or more computing devices, the condition indicators from the continuous flight data.

5. The method of claim 4, wherein the second plurality of components comprises one or more flight control actuators and obtaining, by the one or more computing devices, the condition indicators comprises:
obtaining, by the one or more computing devices, continuous parameter data indicative of flight control surface movement of the aircraft; and
determining, by the one or more computing devices, the respective responses of the one or more flight control actuators to the respective control signals based at least in part on the continuous parameter data.

6. The method of claim 1, wherein identifying, by the one or more computing devices, the one or more root causes comprises applying, by the one or more computing devices, automated reasoning technology to the comprehensive data set to identify the one or more root causes.

7. The method of claim 1, wherein identifying, by the one or more computing devices, the one or more root causes comprises identifying, by the one or more computing devices, one or more patterns exhibited by the comprehensive data set, the one or more patterns associated with the one or more root causes.

8. The method of claim 7, wherein identifying, by the one or more computing devices, the one or more patterns exhibited by the comprehensive data set comprises determining, by the one or more computing device, that a first plurality of parameters described by the comprehensive data set respectively satisfy a first plurality of pattern conditions.

9. The method of claim 1, wherein identifying, by the one or more computing devices, the one or more root causes comprises executing, by the one or more computing devices, a step-wise logic process based at least in part on the comprehensive data to identify the one or more root causes.

10. An aircraft health monitoring system, the system comprising:
one or more processors; and
one or more memory devices that store instructions executable by the one or more processors, wherein execution of the instructions by the one or more processors causes the aircraft health monitoring system to:
obtain fault data indicative of a plurality of fault indications provided by a first plurality of components of an aircraft;
obtain condition indicators representative of respective operational conditions of a second plurality of components of the aircraft;
detect one or more anomalous features exhibited by the condition indicators; and
identify one or more root causes of the plurality of fault indications based at least in part on the one or more anomalous features exhibited by the condition indicators:
fuse the one or more anomalous features and the fault data to generate a comprehensive data set;
identify the one or more root causes of the plurality of fault conditions based at least in part on the comprehensive data set;
generate one or more alerts that describe the one or more root causes of the plurality of fault conditions; and
provide the one or more alerts for display to maintenance personnel associated with the aircraft, and
wherein in identifying the one or more root causes of the plurality of fault conditions, the one or more processors are configured to:
identify each instance the comprehensive data set evidences a potential cause of the plurality of fault conditions, the comprehensive data set being supplemented over time with additional fault data or additional condition indicator data;
increase a confidence score associated with the potential cause for each instance the comprehensive data set evidences the potential cause, wherein increasing the confidence score indicates an increased likelihood that the potential cause is an identified cause of the plurality of fault indications, and wherein the confidence score is increased for each instance by a standard set amount;

determine after the confidence score is increased, whether the confidence score exceeds a threshold value; and in response to the confidence score exceeding the threshold value, output an alert that describes the potential cause as the identified cause of the fault indications, the alert being one of the one or more alerts.

11. The system of claim 10, wherein to obtain the condition indicators, the system:

derives the condition indicators from continuous parameter data indicative of respective continuous operational conditions of the second plurality of components of the aircraft.

12. The system of claim 10, wherein to identify the one or more root causes based at least in part on the comprehensive data set, the system automatically applies logic-based or probabilistic reasoning to the comprehensive data set to identify the one or more root causes of the plurality of fault indications.

13. The system of claim 10, wherein to identify the one or more causes of the plurality of fault conditions, the system:

accesses one or more rules that describe previously established relationships between anomalous feature behavior, specific fault indications, and root causes of fault indications; and applies the one or more rules to the comprehensive data set to identify the one or more root causes of the plurality of fault conditions.

14. The system of claim 10, wherein the system comprises an in-vehicle health monitoring system physically located within an aircraft, and wherein the system operates in real-time during aircraft operation.

15. A computer-implemented system for monitoring aircraft system health, the system comprising at least one processor, the system configured to:

obtain fault data indicative of a plurality of fault indications provided by a first plurality of components of an aircraft;

obtain condition indicators representative of respective operational conditions of a second plurality of components of the aircraft;

fuse the fault data with the condition indicators to form a comprehensive data set;

identify one or more root causes of the plurality of fault conditions based at least in part on the comprehensive data set;

generate one or more alerts that describe the one or more root causes of the plurality of fault conditions; and provide the one or more alerts for display to maintenance personnel associated with the aircraft, and wherein in identifying the one or more root causes of the plurality of fault conditions, the one or more processors are configured to:

identify each instance the comprehensive data set evidences a potential cause of the plurality of fault conditions, the comprehensive data set being supplemented over time with additional fault data or additional condition indicator data;

increase a confidence score associated with the potential cause for each instance the comprehensive data set evidences the potential cause, wherein increasing the confidence score indicates an increased likelihood that the potential cause is an identified cause of the plurality of fault indications, and wherein the confidence score is increased for each instance by an amount that is proportional to a degree to which the evidence indicates the potential cause;

determine after the confidence score is increased, whether the confidence score exceeds a threshold value; and in response to the confidence score exceeding the threshold value, output an alert that describes the potential cause as the identified cause of the fault indications, the alert being one of the one or more alerts.

16. The system of claim 15, wherein the system comprises a ground-based system that obtains the fault data and continuous system response data from an aircraft during flight.

17. The system of claim 15, wherein:

the fault data comprises fault codes provided by a plurality of flight control computers that respectively control the second plurality of components of the aircraft;

the condition indicators are representative of respective responses of the second plurality of components of the aircraft to respective control signals provided to the second plurality of components by the plurality of flight control computers; and the system is further configured to derive the condition indicators representative of respective responses of the second plurality of components of the aircraft to respective control signals from continuously recorded flight data.

* * * * *